US009191328B2

United States Patent
Mogul et al.

(10) Patent No.: US 9,191,328 B2
(45) Date of Patent: Nov. 17, 2015

(54) FORWARDING BROADCAST TRAFFIC TO A HOST ENVIRONMENT

(75) Inventors: Jeffrey Mogul, Menlo Park, CA (US); Praveen Yalagandula, Redwood City, CA (US); Jayaram Mudigonda, San Jose, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 478 days.

(21) Appl. No.: 12/822,438

(22) Filed: Jun. 24, 2010

(65) Prior Publication Data

US 2011/0320630 A1    Dec. 29, 2011

(51) Int. Cl.
*G06F 15/16* (2006.01)
*H04L 12/801* (2013.01)
*H04L 12/823* (2013.01)

(52) U.S. Cl.
CPC ............... *H04L 47/15* (2013.01); *H04L 47/12* (2013.01); *H04L 47/32* (2013.01)

(58) Field of Classification Search
None
See application file for complete search history.

(56) References Cited

U.S. PATENT DOCUMENTS

| 5,708,654 | A  | * | 1/1998 | Arndt et al. ................... 370/242 |
| 5,727,149 | A  | * | 3/1998 | Hirata et al. .................. 709/250 |
| 2003/0131082 | A1 | * | 7/2003 | Kachi ............................ 709/220 |
| 2004/0111519 | A1 | * | 6/2004 | Fu et al. ........................ 709/229 |
| 2005/0195832 | A1 | * | 9/2005 | Dharmapurikar et al. ........................ 370/395.31 |
| 2008/0229101 | A1 | * | 9/2008 | Thomas ........................ 713/168 |
| 2009/0225676 | A1 | * | 9/2009 | Kisela et al. .................. 370/252 |

FOREIGN PATENT DOCUMENTS

CN    101141390    3/2008

* cited by examiner

*Primary Examiner* — Scott B Christensen
(74) *Attorney, Agent, or Firm* — Hewlett-Packard Patent Department

(57) ABSTRACT

A network interface controller (NIC) determines link layer broadcast traffic of interest to the host environment. The NIC receives link layer broadcast traffic intended for the host environment, including traffic of interest and unwanted traffic. The NIC discards the unwanted traffic and forwards the traffic of interest to the host environment.

14 Claims, 5 Drawing Sheets

FORWARDING BROADCAST TRAFFIC TO A HOST ENVIRONMENT

BACKGROUND

In a large Ethernet-based network there are several possible sources of broadcast traffic whose rate scales with the number of nodes (N) on the network. One consequence of this increased broadcast rate is that each node on the network receives a stream of broadcast packets, whose rate increases with N.

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

Figure 1:
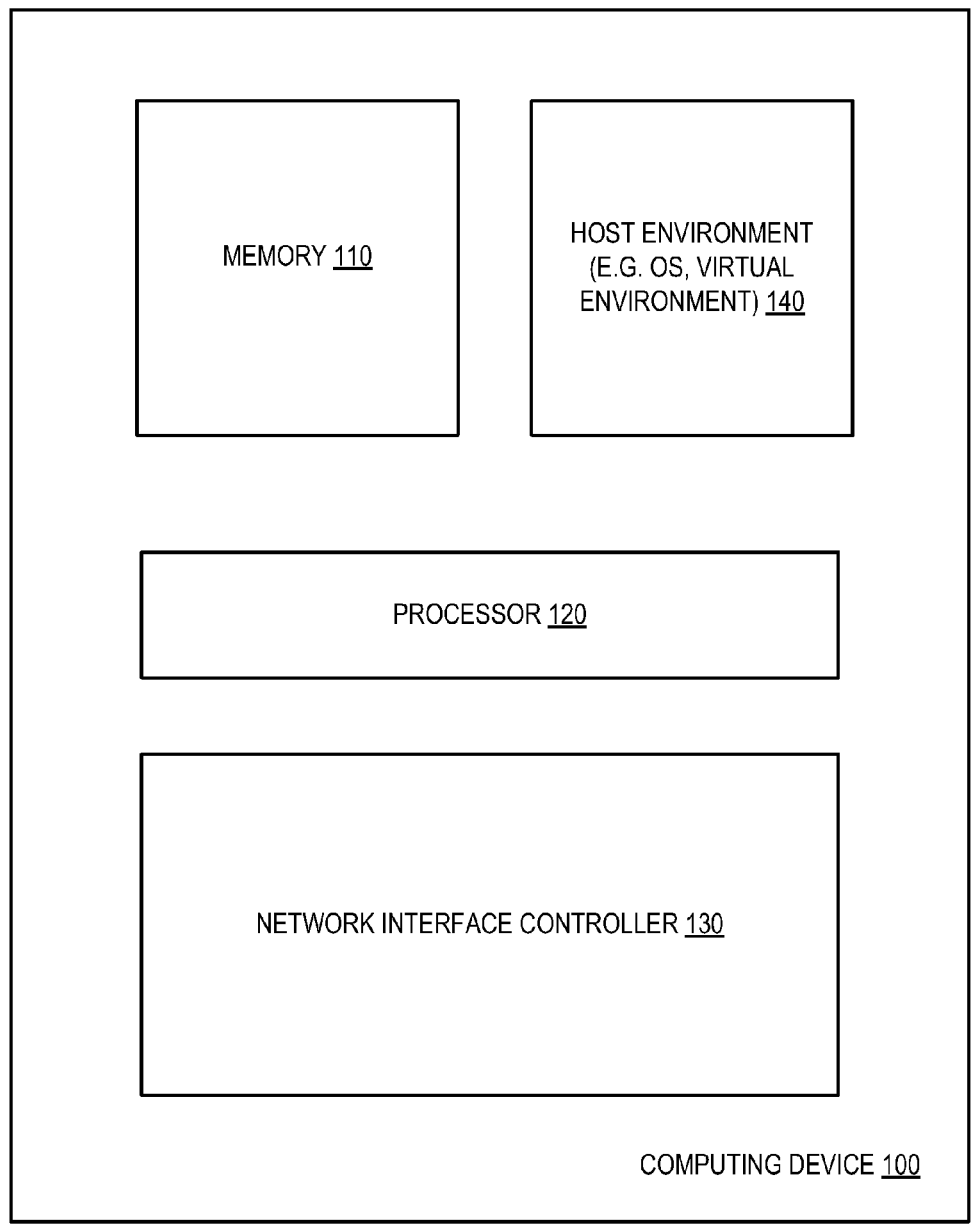
FIG. 1 is a block diagram illustrating a system according to various embodiments.

The Open System Interconnection, or OSI, model is a way of sub-dividing a computing system into layers from the point of view of communications. Of the seven layers described by the model, Layer 2 (also known as the Data Link Layer, or Ethernet Layer) is primarily responsible for physical addressing. Layer 3 (or Network Layer) is primarily responsible for logical addressing. In particular, the Network Layer maps logical addresses to physical addresses (as defined by Layer 2 of the OSI model). For example, the Network Layer may map an IP (Internet Protocol) address (logical address) to a MAC (media access control) address (a physical address). In general, the logical addressing scheme used at Layer 3 offers several benefits, including scale and flexibility. For at least these reasons, large Layer 3 networks are common.

Large Layer 2 networks are often avoided, in part, because of the problem of broadcast overload. In a Layer 2 network, broadcast traffic has a rate that scales with the number of nodes in the network. Thus, the larger the Layer 2 network, the larger the rate of broadcast traffic on the network. Typically, nodes (or "hosts") on the network process broadcast traffic using the host CPU. As the rate of broadcast traffic increases on a Layer 2 network, host CPUs can become overburdened in processing broadcast traffic. For example, ARP (Address Resolution Protocol) requests can be a significant source of broadcast traffic on a Layer 2 network. Most ARP request broadcasts are unimportant and/or unwanted from the perspective of a single network node. Thus, a single host CPU may become overburdened by the task of discarding unwanted ARP requests and/or other broadcast traffic. In another example, enterprise endpoints on an enterprise network may only communicate with a few particular servers and can easily be saturated by unwanted broadcast traffic from other enterprise nodes.

Many network nodes include an onboard network interface controller (NIC) that serves as an intermediary for communication between the network and the network node. With respect to the OSI model, a NIC exists on both Layer 1 and Layer 2. Frequently, NICs have a separate NIC processor (e.g., an Ethernet chip) that connects to the host motherboard via a bus (e.g., PCI, PCI express, etc.). Typically, the NIC passes broadcast traffic from the network (e.g., ARP requests, etc.) to the host CPU for processing. In other words, the host CPU receives broadcast packets to determine how to handle them. In embodiments described herein, the host CPU (or more generally, a host environment) communicates certain decision-making information related to broadcast traffic to the NIC. Accordingly, at least some of the processing overhead related to broadcast traffic can be handled by the NIC. In various embodiments, the NIC is able to determine broadcast traffic of interest to the host CPU and forward such traffic to the CPU while discarding unwanted traffic. In this way, the burden on the host CPU from broadcast traffic (including Layer 2 broadcast traffic) is reduced, thereby removing a significant obstacle in creating large Layer 2 networks.

FIG. 1 is a block diagram illustrating a computing device according to various embodiments. As shown, computing device 100 includes a memory 110, a processor 120 and a NIC 130. Various elements and/or components could be added, removed or changed in different embodiments. Memory 110 can be any type of memory used for storing data (e.g., RAM, ROM, flash memory, etc.). In particular, memory 110 stores a filter specification. As used herein, a filter specification can be any information or expression that facilitates a filtering decision. In particular, a filter specification facilitates separating broadcast traffic of interest from unwanted broadcast traffic. For example, in some embodiments, a filter specification may be a table of addresses (e.g., IP addresses, MAC addresses, etc.) or a table of address pairs (e.g., IP/MAC pairs). Such addresses and/or address pair may specifically represent traffic of interest or unwanted traffic. In particular, examples of a filter specification could include an ARP (Address Resolution Protocol) table or a DHCP (Dynamic Host Control Protocol) client address filter specification. In other embodiments, a filter specification can be a set of one or more definitions, rules, priorities, etc. that dictate the classification of broadcast traffic. For example, the filter specification could define traffic of interest as including all even (or odd) numbered MAC addresses. Memory 110 stores the filter specification as directed by processor 120. Processor 120 may update and/or change the filter specification (or elements thereof) dynamically, for example, based on changing network conditions, traffic flows, processing tasks, etc.

NIC 130 filters broadcast traffic based on traffic of interest to host environment 140. For convenience, Layer 2 broadcast traffic is referred to herein as link layer broadcast traffic while Layer 3 broadcast traffic is referred to as network layer broadcast traffic. Host environment 140 may be an operating system executed by processor 120 or it may be another type of environment such as a virtual machine, virtual appliance or other suitable environment that handles network traffic. In various embodiments, NIC 130 obtains the filter specification discussed above (e.g., from host environment 140) to determine the traffic of interest. Link layer broadcast traffic of interest is forwarded from NIC 130 to host environment 140. Based on the filtering, NIC 130 discards, drops, ignores or otherwise prevents unwanted traffic from reaching host environment 140, thereby reducing the processing burden on processing 120.

In an example, computing device 100 could be a non-DHCP (Dynamic Host Configuration Protocol) server node that is not interested in receiving broadcasts destined for DHCP servers (e.g., DHCP discover datagrams, DHCP requests, etc.). Thus, host environment 140 may communicate (via processor 120) a filter specification to NIC 130 indicating that DHCP broadcasts destined for UDP (User Datagram Protocol) port 67 (signifying that the packet is destined for a DHCP server) constitute unwanted traffic. Accordingly, NIC 130 may detect IP packets carrying UDP datagrams by parsing the Ethernet type field and the IP protocol field of the datagrams. If the UDP port number is 67 the packet is discarded instead of allowing it to be forwarded to host environment 140.

In another example, host environment 140 has a host address H. The host address H may be included in a filter specification sent to NIC 130. The filter specification could include multiple addresses (e.g., if host environment 140 has multiple IP addresses, or if multiple environments exist on computing device 100, each environment having a separate IP address). NIC 130 detects ARP packets by parsing the Ethernet type field. If the IP address X in an ARP request packet is equal to the host address H, then NIC 130 transfers the packet to host environment 140. Otherwise, the packet is discarded.

In yet another example, NIC 130 receives an ARP broadcast from host X (e.g., either because host X is updating its own MAC address or it is requesting the Ethernet address of host Y). As discussed previously, NIC 130 filters broadcast traffic according to a filter specification (e.g., received from host environment 140). In some embodiments, the filter specification could be a copy of the ARP table for host environment 140. Thus, ARP broadcasts corresponding to entries in the ARP table would be considered traffic of interest to host environment 140. When host environment 140 adds a new address to the ARP table, a corresponding entry could be added to the filter specification in NIC 130. Thus, in this example, if the filter specification has an entry for host X, NIC 130 forwards the corresponding ARP broadcast to host environment 140.

In certain embodiments, rather than mirroring an entire ARP table to NIC 130, a data structure and/or corresponding algorithm could be employed to determine a representative set of interesting traffic (e.g., approximating the contents of the ARP table). For example, a Bloom filter might be used to represent a set and/or class of interesting traffic. A Bloom filter has the advantage of not generating false negatives while consuming less storage space than a table (e.g., ARP table) which it is intended to represent. In a Bloom filter approach, NIC 130 receives addresses that denote traffic of interest from host environment 140 and incorporates them into its Bloom filter accordingly. Thus, when NIC 130 receives an ARP broadcast packet, the corresponding address (e.g., IP address) of the broadcast packet is run through the Bloom filter. If the Bloom filter produces a match, the ARP packet is conveyed to host environment 140.

Figure 2:
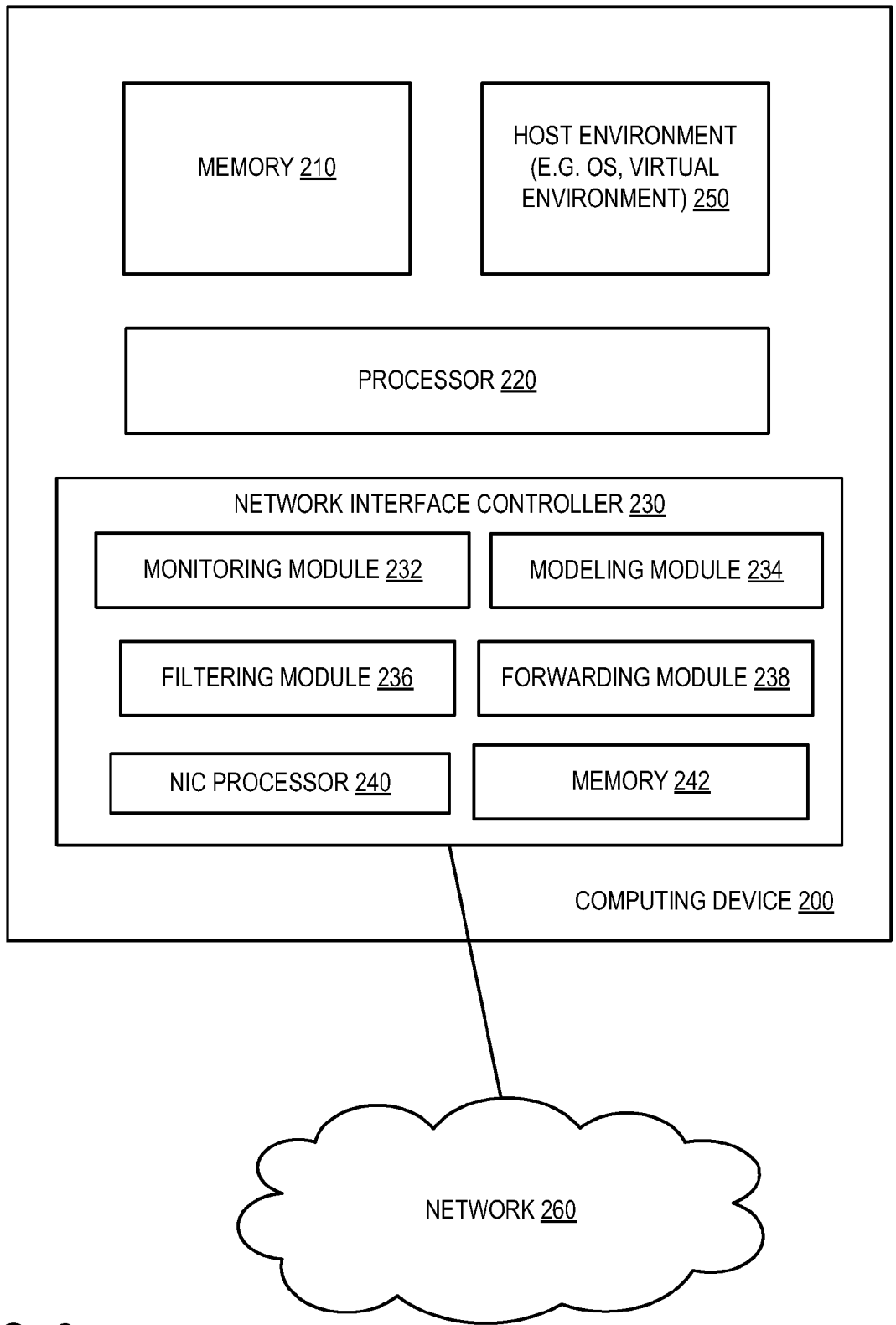
FIG. 2 is a block diagram illustrating a system according to various embodiments.

FIG. 2 is a block diagram illustrating a system according to various embodiments. Various elements and/or components illustrated in FIG. 2 could be added, removed or changed in different embodiments. Computing device 200 is a node connected to network 260. While network 260 can generally be representative of any network, various embodiments described herein are directed link layer (i.e., Layer 2) networks. Computing device 200 receives broadcast traffic from network 260. Again, broadcast traffic can be any type of broadcast traffic, although various examples described herein refer specifically to link layer broadcast traffic. In particular, the link layer broadcast traffic is received by NIC 240 on behalf of computing device 200.

Monitoring module 232 monitors broadcast traffic (e.g., link layer broadcast traffic) between computing device 200 and network 260 and, more specifically, between host environment 250 and network 260. Based on the monitoring, modeling module 234 builds a filter specification model to approximate traffic of interest to host environment 250. For example, NIC 240 might initially forward all broadcast traffic to host environment 250. Monitoring module 232 then tracks, for example, ARP broadcasts received from network 260, along with any responses to the ARP broadcast from host environment 250. Based on this incoming and outgoing traffic, modeling module 234 builds a filter specification model that predicts the actual filter specification used by host environment 250, or, at the very least, imitates the response behavior of host environment 250. In one example, host environment 250 sends an IP packet to host Y or a broadcast ARP request for the IP address of host Y. In this case, modeling module 234 might infer that host Y is of interest to host environment 250. In another example, host environment 250 replies to a particular ARP broadcast. In this case, modeling module 234 might infer that IP address requested in the ARP broadcast is of interest to host environment 250. In yet another example, if host environment 250 does not respond to an ARP request, then modeling module 234 might infer that the IP address in the ARP request is not of interest to host environment 250.

In view of the model generated by modeling module 234, a filtering module 236 determines the link layer broadcast traffic of interest to host environment 250 and filters out unwanted traffic.

The various modules and/or other components described herein could be implemented as a computer-readable storage medium containing instructions executable by a processor (e.g., NIC processor 240, processor 220, etc.) and stored in a memory (e.g., memory 210, memory 242, etc.).

Figure 3:
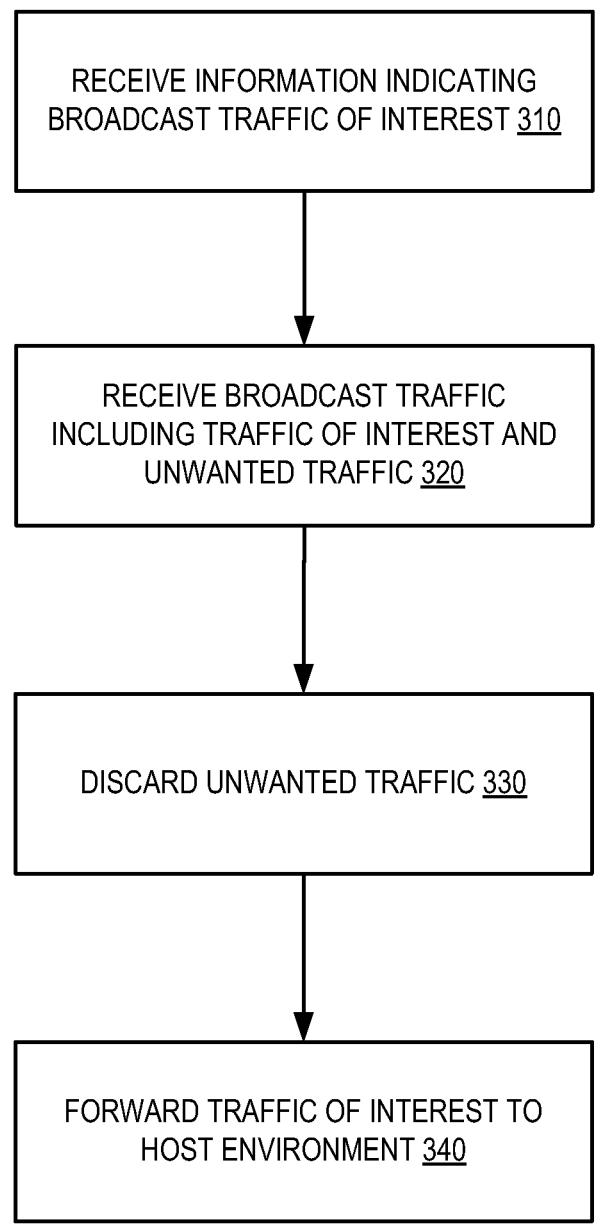
FIG. 3 is a flow diagram of operation in a system according to various embodiments.

FIG. 3 is a flow diagram of operation in a system according to various embodiments. FIG. 3 includes particular operations and execution order according to certain embodiments. However, in different embodiments, other operations, omitting one or more of the depicted operations, and/or proceeding in other orders of execution may also be used according to teachings described herein.

A NIC on a computing device receives 310 information from a host environment (on the same computing device) indicating broadcast traffic of interest. The host environment could be an operating system, a virtual machine monitor, a virtual appliance, or other suitable environment for handling traffic from a network. For example, the information received by the NIC could be a list of addresses (e.g., a copy of all or part of an ARP table), a set of one or more filtering rules, or it could be a data structure and corresponding algorithm for determining traffic of interest (e.g., a filter such as a Bloom filter).

The NIC receives 320 broadcast traffic intended for the host environment. While the broadcast traffic can be associated with various OSI layers, the broadcast traffic is link layer (i.e., OSI Layer 2) traffic in certain embodiments. Received broadcast traffic includes both traffic of interest and unwanted traffic. The NIC distinguishes between the traffic of interest and the unwanted traffic (e.g., based on the received information from the host environment) and discards 330 the unwanted traffic. Discarding traffic may include dropping packets, ignoring packets, or otherwise preventing packets from being forwarded to the host environment on the corresponding computing device.

The NIC forwards 340 traffic of interest to the host environment. Traffic is forwarded based on the information received from the host environment. In some embodiments, the NIC may only forward a sampling of the traffic of interest to the host environment or the NIC may forward a sampling of all traffic (i.e., both traffic of interest and unwanted traffic). For example, the NIC could forward every nth packet to the host environment; the NIC could send packets with a probability of 1/n; or the NIC could use timer-based forwarding to send a packet, for example, no more than every n seconds or no less than every m seconds to the host environment.

Figure 4:
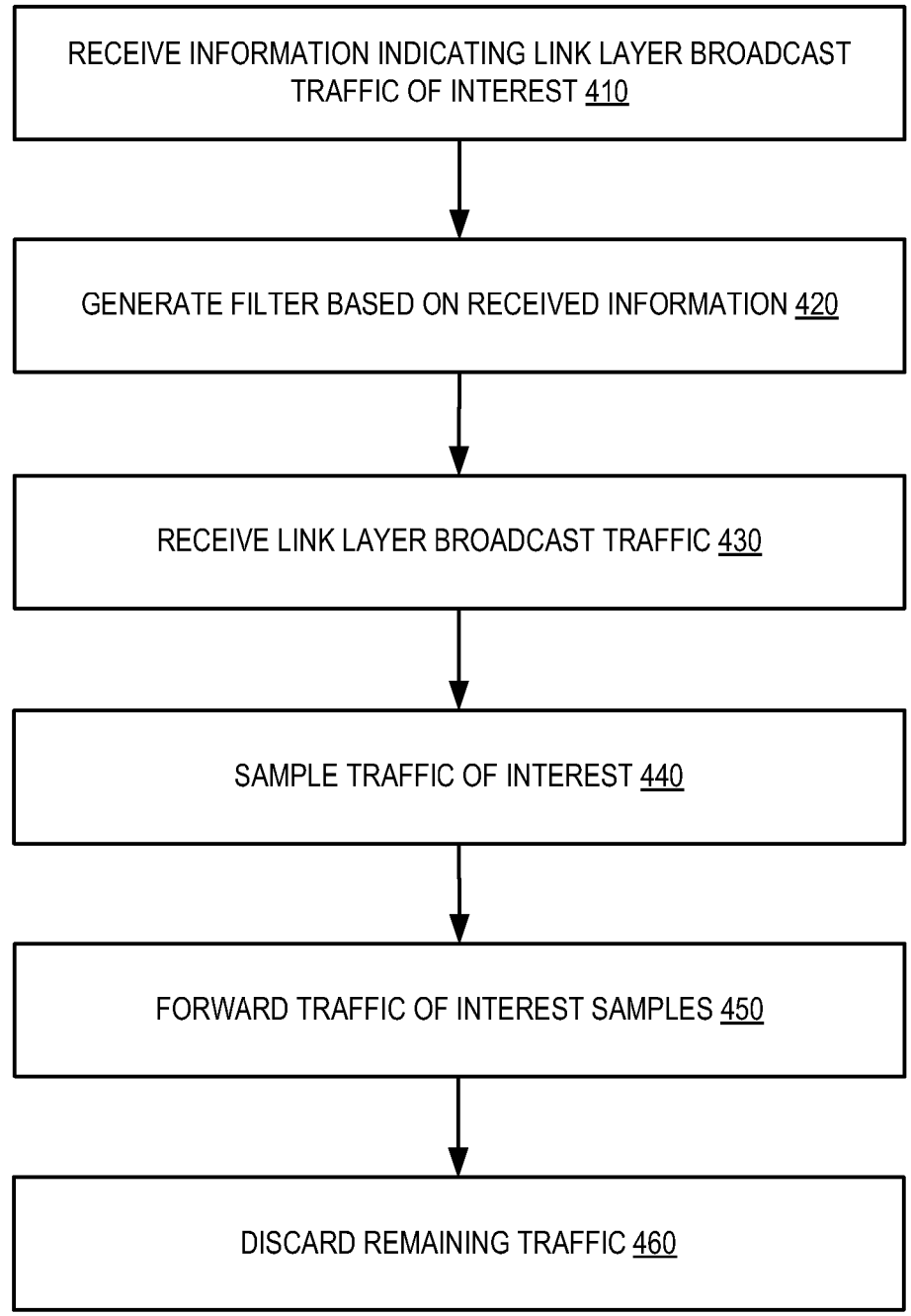
FIG. 4 is a flow diagram of operation in a system according to various embodiments.

FIG. 4 is a flow diagram of operation in a system according to various embodiments. FIG. 4 includes particular operations and execution order according to certain embodiments. However, in different embodiments, other operations, omitting one or more of the depicted operations, and/or proceeding in other orders of execution may also be used according to teachings described herein.

A NIC on a network-connected computing device receives 410 information indicating link layer broadcast traffic of interest. In some embodiments, the broadcast traffic could be traffic associated with a different layer (e.g., OSI layer). The received information could be a set of one or more addresses (e.g., a table, such as an ARP table), a set of one or more rules (e.g., discard packets with odd MAC addresses and keep packets with even MAC addresses, etc.), definitions, filtering algorithms, a sampling rate, or other suitable information for distinguishing traffic of interest from unwanted traffic. A filter is generated 420 based on the received information. In various embodiments, the filter is generated by the NIC, although in certain embodiments the host environment or other entity could generate the filter instead. By having the NIC generate the filter (rather than the host environment generating the filter), the host environment avoids having to understand the details of the NIC's filtering implementation, such as the amount of memory available for a Bloom filter, or the availability of specific hash-computation hardware. In some embodiments, the NIC could offload filter generation elsewhere such as to another location on the network if, for example, the NIC lacked sufficient processing power to generate the filter on its own.

The NIC receives 430 link layer broadcast traffic from a network. Examples of link layer broadcast traffic include ARP broadcast and DHCP broadcasts. The NIC filters the received broadcast traffic according to the generated filter to determine the traffic of interest. In various embodiments, the NIC samples 440 the determined traffic of interest. For example, the NIC could sample every nth packet or sample packets with a probability of 1/n. The NIC could also employ a timer to sample one or more packets, for example, every n seconds. The NIC forwards 450 the sampled traffic of interest to the host environment. The sampling might occur in response to particular network conditions. For example, if filtering and discarding unwanted traffic at the NIC is not alone sufficient to reduce the processing burden on the host environment, then forwarding only a sample or subset of traffic of interest may alleviate the processing burden. Thus, unwanted and/or unsampled traffic is discarded 460 or otherwise not forwarded to the host environment.

Figure 5:
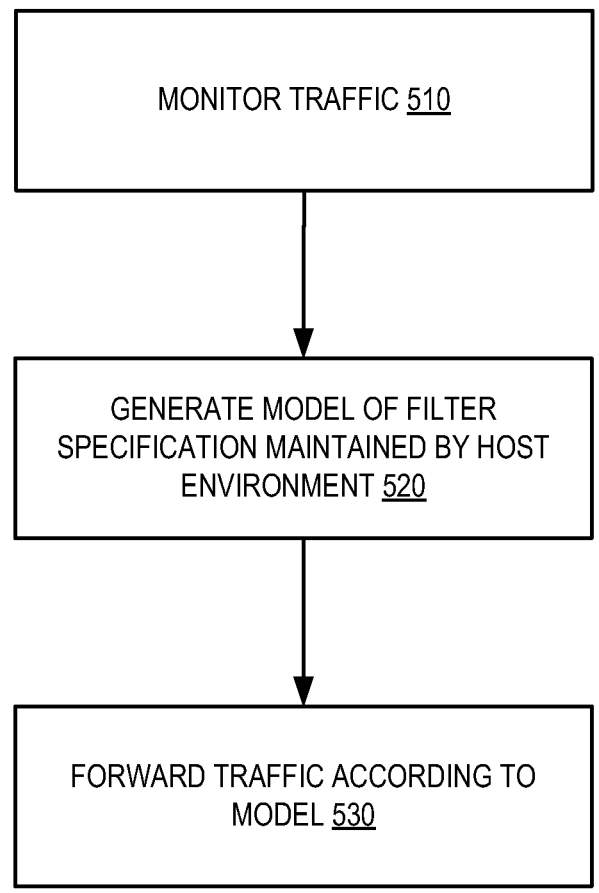
FIG. 5 is a flow diagram of operation in a system according to various embodiments.

FIG. 5 is a flow diagram of operation in a system according to various embodiments. FIG. 5 includes particular operations and execution order according to certain embodiments. However, in different embodiments, other operations, omitting one or more of the depicted operations, and/or proceeding in other orders of execution may also be used according to teachings described herein.

A NIC on a network-connected computing device monitors 510 traffic (e.g., link layer traffic, IP layer unicast traffic, etc.) between the network and a host environment (e.g., an operating system, a virtual machine, etc.) on the computing device. Based on the monitored traffic, the NIC generates 520 a model of a filter specification maintained by the host environment. The filter specification could be a networking table such as an ARP table, a forwarding table, etc. The filter specification could also be a set of one or more rules. More generally, the filter specification can be any information or expression that represents and/or contributes to a determination of a subset of traffic that the host environment is interested in receiving.

The NIC generates the model by tracking host environment responses to received broadcast traffic. In an example, the host environment sends an IP packet to host Y or broadcasts an ARP request seeking the IP address of host Y. In this case, the NIC might infer that host Y is of interest to the host environment. In another example, the host environment replies to a particular ARP broadcast. In this case, the NIC might infer that IP address requested in the ARP broadcast is of interest to the host environment. In yet another example, if the host environment does not respond to an ARP request, then the NIC might infer that the IP address in the ARP request is not of interest to the host environment. Accordingly, the NIC builds the model to predict the behavior of the host environment with respect to received broadcast traffic. Using the model, the NIC filters received broadcast traffic and forwards 530 traffic of interest to the host environment for processing.

Various modifications may be made to the disclosed embodiments and implementations of the invention without departing from their scope. Therefore, the illustrations and examples herein should be construed in an illustrative, and not a restrictive sense.

The invention claimed is:

1. A method performed by a network interface controller (NIC) on a host device connected to a network via the NIC, the method comprising:
   receiving broadcast traffic responses, at the NIC, from a host environment in the host device, indicating broadcast traffic of interest to the host environment, wherein the broadcast responses include responses from the host environment to broadcasts from computing devices connected to the network requesting network addresses from other computing devices connected to the network;
   receiving, at the NIC, broadcast traffic intended for the host environment, including traffic of interest and unwanted traffic;
   discarding, at the NIC, the unwanted broadcast traffic in view of the responses; and
   forwarding, from the NIC, the broadcast traffic of interest to the host environment in view of the responses.

2. The method of claim 1, further comprising:
   the NIC generating a filter based on the received broadcast traffic responses; and
   performing the discarding and forwarding based on the filter.

3. The method of claim 1, wherein forwarding traffic of interest further comprises:
   sampling the traffic of interest at the NIC;
   forwarding a first subset of the traffic to the host environment; and
   discarding a second subset of the traffic of interest.

4. The method of claim 2, wherein the NIC generating a filter based on the received broadcast traffic responses comprises:
monitoring requests from the computing devices, wherein the requests include the broadcasts from the computing devices requesting the network addresses from the other computing devices connected to the network;
determining from the broadcast responses from the host environment whether the host device responded to the requests; and
generating the filter based on the requests that were responded to by the host environment and based on the requests that were not responded to by the host environment.

5. A non-transitory computer-readable storage medium containing instructions that, when executed, cause a computer to:
monitor link layer broadcast traffic between a host environment in a host device connected to a network and other host devices connected to the network, wherein the monitored link layer broadcast traffic includes responses from the host environment to broadcasts from the other host devices requesting network addresses from devices connected to the network;
generate a model of a filter specification maintained by the host environment from the monitored link layer broadcast traffic; and
forward link layer broadcast traffic to the host environment according to the model.

6. The non-transitory computer-readable medium of claim 5, wherein the filter specification includes at least a portion of an Address Resolution Protocol (ARP) table.

7. The non-transitory computer-readable medium of claim 5, wherein the filter specification defines one or more Dynamic Host Configuration Protocol (DHCP) client addresses.

8. The non-transitory computer-readable medium of claim 5, wherein the instructions that cause the computer to generate the model of the filter specification comprise instructions to:
monitor requests from the other host devices, wherein the requests include the broadcasts from the other host devices requesting the network addresses;
determine from the responses from the host environment whether the host environment responded to the requests; and
generate the model based on the requests that were responded to by the host environment and based on the requests that were not responded to by the host environment.

9. A computing device, comprising:
a memory to store a filter specification for the computing device;
a host processor to maintain the filter specification; and
a network interface controller (NIC) to filter link layer broadcast traffic received by the computing device based on link layer broadcast traffic of interest to a host environment associated with the host processor, the NIC including
a monitoring module to monitor traffic between the computing device and hosts on a network, wherein the monitored traffic includes responses from the host environment to broadcasts from the hosts requesting network addresses from devices connected to the network;
a modeling module to model the filter specification from the monitored traffic; and
a filtering module to determine the link layer broadcast traffic of interest to the host environment based at least in part on the model.

10. The computing device of claim 9, wherein the filter specification includes at least a portion of an Address Resolution Protocol (ARP) table.

11. The computing device of claim 9, wherein the filter specification includes one or more Dynamic Host Configuration Protocol (DHCP) client addresses.

12. The computing device of claim 9, further comprising:
a forwarding module to forward link layer broadcast traffic of interest to the host environment.

13. The computing device of claim 12, the filtering module further to:
discard link layer broadcast traffic not determined to be of interest to the host environment.

14. The computing device of claim 9, wherein the monitored traffic includes requests from the hosts, the requests including the broadcasts from the host requesting the network addresses, and wherein,
to model the filter specification, the filter module is to determine from the responses from the host environment whether the host environment responded to the requests, andmodel the filter specification based on the requests that were responded to by the host environment and based on the requests that were not responded to by the host environment.

* * * * *